(12) United States Patent
Louer

(10) Patent No.: US 10,922,145 B2
(45) Date of Patent: Feb. 16, 2021

(54) SCHEDULING SOFTWARE JOBS HAVING DEPENDENCIES

(71) Applicant: Target Brands, Inc., Minneapolis, MN (US)

(72) Inventor: Jason Louer, Saint Paul, MN (US)

(73) Assignee: Target Brands, Inc., Minneapolis, MN (US)

( * ) Notice: Subject to any disclaimer, the term of this patent is extended or adjusted under 35 U.S.C. 154(b) by 150 days.

(21) Appl. No.: 16/121,292

(22) Filed: Sep. 4, 2018

(65) Prior Publication Data

US 2020/0073727 A1 Mar. 5, 2020

(51) Int. Cl.
*G06F 9/52* (2006.01)
*G06F 9/48* (2006.01)
*G06F 16/901* (2019.01)

(52) U.S. Cl.
CPC .............. *G06F 9/52* (2013.01); *G06F 9/4887* (2013.01); *G06F 16/9024* (2019.01)

(58) Field of Classification Search
None
See application file for complete search history.

(56) References Cited

U.S. PATENT DOCUMENTS

| | | | |
|---|---|---|---|
| 7,383,253 B1 | 6/2008 | Tsimelzon et al. | |
| 9,576,028 B2 | 2/2017 | Schechter et al. | |
| 10,048,955 B2* | 8/2018 | Ahmed | G06F 8/48 |
| 10,133,797 B1* | 11/2018 | Mishra | G06F 16/254 |
| 10,567,248 B2* | 2/2020 | Chu | H04L 43/045 |
| 2005/0131927 A1 | 6/2005 | Fildebrandt et al. | |
| 2009/0113163 A1* | 4/2009 | Erb | G06F 12/023 |
| | | | 711/171 |
| 2009/0254774 A1 | 10/2009 | Chamdani et al. | |
| 2011/0225143 A1 | 9/2011 | Khosravy et al. | |
| 2012/0079490 A1 | 3/2012 | Bond et al. | |
| 2012/0102153 A1 | 4/2012 | Kemp et al. | |
| 2018/0152361 A1* | 5/2018 | Chu | H04L 67/02 |
| 2018/0173502 A1* | 6/2018 | Biskup | G06F 8/71 |
| 2018/0356989 A1* | 12/2018 | Meister | G06F 11/2089 |
| 2018/0365614 A1* | 12/2018 | Palmer | G06Q 10/06 |

FOREIGN PATENT DOCUMENTS

WO 2014102797 7/2014

* cited by examiner

*Primary Examiner* — Umut Onat (57) ABSTRACT

A scheduling platform can be used for self-service automation of workflows, such as automating data mart creation or generating reports. The platform includes a scheduling model that includes configuring pre- and post-conditions for a job that defines when the task runs and its effects on other jobs when it finishes.

20 Claims, 11 Drawing Sheets

SCHEDULING SOFTWARE JOBS HAVING DEPENDENCIES

TECHNICAL FIELD

The present disclosure relates generally to software job scheduling technology, and in particular to scheduling jobs having dependencies.

BACKGROUND

Organizations often have a need to perform software jobs, such as analysis on various portions of the data that the organization collects. It is advantageous to perform analysis on information that is ready to be analyzed (e.g., is up-to-date or is in a final form). However, that can raise a great amount of complexity because of the variety of data flows that may be involved. And it can be difficult to determine how and when to perform a software job due to complex synchronization of dependencies. For example, when preparing queries or analytics, it may be necessary to ensure appropriate synchronization of data dependencies such that a particular report contains up-to-date information. For instance, most scheduling systems require a user to set up a task that occurs at a time of day. However, it is difficult to determine the appropriate time to schedule tasks to ensure proper synchronization, especially with large amounts of data sources and dependencies. Accordingly, there is a need for improvements in job scheduling technology.

SUMMARY

The subject matter of this disclosure includes a software platform that provides job scheduling. The platform can include a portal over which a user can edit, view, and automate workflows. A particular job can be received over the portal (e.g., in the form of an SQL query) and a dependency generator of the software platform creates a directed, acyclic graph. Workflows are then scheduled based on the acyclic graph.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Disclosed examples include software platforms for scheduling software jobs. In this manner, disclosed examples provide a software platform through which users can create, edit, view, and automate software jobs, such as business intelligence workflows and reports.

The scheduling platform can include a scheduler that causes jobs to be performed based on pre-conditions on which the jobs depend (e.g., data being loaded for the previous day in a table that the job uses). The jobs can explicitly or implicitly specify the pre-conditions, and can also document post-conditions that inform the scheduling platform of the effect of job completion (e.g., the job created data in a summary table). In this manner, the scheduling platform can advantageously allow loose coupling between jobs where jobs depend on resources (e.g., tables, files, processes) instead of other jobs directly. Downstream processes need not be coupled to upstream tasks directly and can instead be coupled through an abstraction layer provided by resource pre-conditions and post-conditions.

In an example, the platform can receive a definition of a report job in the form of a query, such as an SQL query or a query in any other Data Structure Language (DSL), which can be imported from any of a number of types of tools. The query can be entered into a particular field, and the scheduling services can detect from that query the input tables or other resources implicated by the query, as well as output tables implicated by the query. The platform can have additional features to define the frequency in which the report should be run. The platform can automatically generate a virtual representation of the query within an overall business intelligence workflow, for example as a directed acyclic graph. Each job in a directed acyclic graph, or other resource, has state information associated with it. That state information can include, for example, the last time it completed or is up to date, as well as an update frequency. Accordingly, a job requiring up to date information from a plurality of tables will not execute until those tables upon which it depends are updated (if an update is expected) prior to initiating the query job.

Where a job describes its pre-conditions and post-conditions, this metadata of the job can be used to provide a complete end-to-end view of the data flow of the job. This can allow insights into the job and resources. For example, where a database change is pending to a table, the metadata can be used to identify all jobs affected by the change.

The scheduling platform can also integrate with other scheduling systems. The scheduler can run on information regarding resource availability, which means that it can integrate across various types of systems where the metadata about resource availability on those systems can be gathered and pushed (or pulled) into the scheduling system. For instance, batch status can be determined using SQL queries. To integrate with dependencies and resources outside of the scheduling platform directly, a polling process can be used to examine the metadata of the external systems to determine the status of relevant resources. Advantageously, the use of metadata by the system can allow for decoupling from specific scheduling tools or approaches.

The scheduling platform can be used to schedule jobs in a variety of contexts. In an example, the scheduling platform can be used to facilitate automating repetitive data processing and reporting patterns. This can include, for example, jobs for moving and transforming data between heterogeneous systems (e.g., automated business intelligence tools, data streaming, data processing, and data pipelines), as well as automating dashboards, automating reports, and collaborating with other teams to integrate data on platforms. Jobs can further include executing scripts (e.g., R programming language scripts, scripts having queries, batch scripts, etc.) and executing actions on remote systems (e.g., via SSH commands). The platform can include or cooperate with data processing platforms, reporting platforms (e.g., batch report generation in tabular, HTML, or PDF formats), file and monitoring (e.g., watching, moving, or archiving files).

Figure 1:
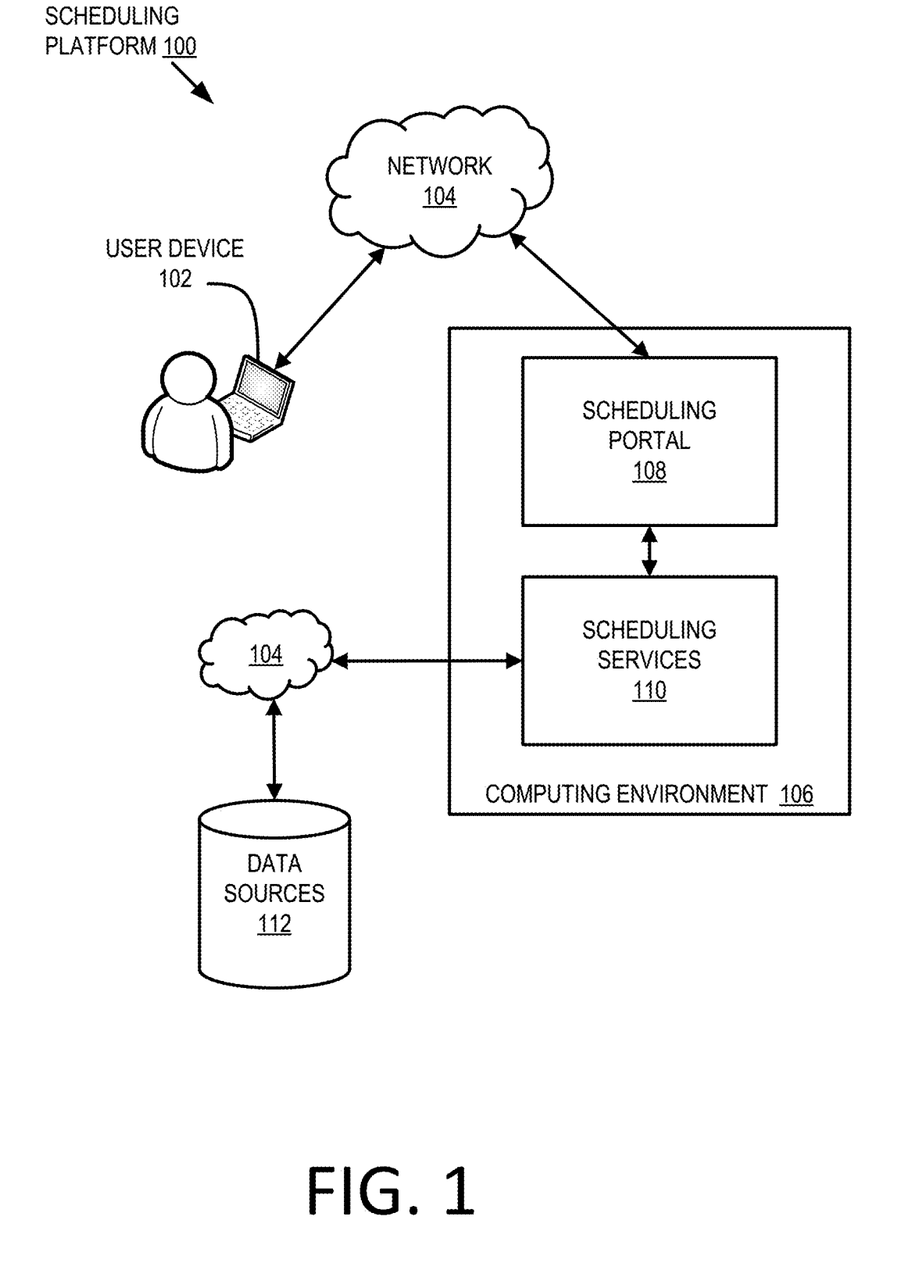
FIG. 1 illustrates an example scheduling platform.

FIG. 1 illustrates an example scheduling platform 100. The platform 100 includes a user device 102 connected over a network 104 to a computing environment 106 that provides a scheduling portal 108. The computing environment 106 further includes scheduling services 110 that facilitate scheduling jobs based on information received over the scheduling portal 108, among other services. The portal services 110 can be connected to data sources 112. The data sources 112 may be stored locally on the computing environment 106 or, as illustrated, connected to the computing environment 106 over the network 104.

The scheduling portal 108 is a user-facing interface with which users can interact to access various capabilities provided by the computing environment 106, including job scheduling. The format of the scheduling portal 108 can be flexible. In an example, the scheduling portal 108 is a website that provides capabilities to the user. In another example, the scheduling portal 108 is an application executable on a user device (e.g., a smartphone application, desktop software, etc.) that provides capabilities to the user. In yet another example, the scheduling portal 108 can be configured as a chat bot or another interactive program that the user can contact. Given the flexibility of the scheduling portal 108, while FIG. 1 illustrates the scheduling portal 108 as being a part of the computing environment 106 (e.g., a website hosted by or having assets provided by the computing environment 106), it need not be. For example, the scheduling portal 108 can be an application locally-installed on the user device 102 that communicates with the computing environment 106 over the network 104 to access scheduling services 110 to provide scheduling portal capabilities to the user.

The user device 102 can be any device suitable for accessing the scheduling portal 108. For example, where the scheduling portal 108 is a website, the user device 102 can be any suitable computing device for accessing the website. Where the scheduling portal 108 is a locally-installed application, the user device 102 can be any suitable computing device for executing a locally-installed application. An example of an architecture of a user device 102 is provided in FIG. 11.

The network 104 is an electronic communication medium that facilitates communication between multiple different devices (e.g., user device 102 and computing environment 106 as illustrated in FIG. 1). The network 104 can include links between multiple computing devices and can include a variety of different kinds of hardware (e.g., routers, hubs, servers, etc.) or software to connect the devices. The network 104 can vary in scope and configuration. In some examples, the network 104 is a local area network, a wide area network (e.g. the Internet), or an intranet, among others.

The computing environment 106 can be any computing environment suitable for providing scheduling services 110.

In many embodiments, the computing environment may be a server or a virtual machine running on a server, but other implementations may also be used. An example of an architecture of a computing environment 106 is provided in FIG. 11.

The scheduling services 110 can take a variety of forms, including one or more software engines configured to provide services. Although illustrated as being part of a single computing environment 106, one or more aspects of the scheduling services 110 can be located elsewhere or scattered across multiple different computing environments 106. Examples of services provided by the scheduling services 110 are described in more detail with respect to FIG. 3.

The data sources 112 can be one or more sources of data. These data sources 112 can be any of a variety of different kinds of data sources, including data stored locally on the user device 102, data stored locally on the computing environment 106, data stored on a corporate network, and data hosted by third parties, among other data. The data sources 112 can be located in a variety of different locations. For example, while some data sources 112 may be stored locally on the computing environment 106, some data sources may be accessible to the computing environment 106 over the network 104.

The data sources 112 often include databases of information. The data sources 112 can be configured as a data warehouse acting as a repository of information from multiple different sources. In an example, the data warehouse is configured using a data warehouse product such as SAP BUSINESS WAREHOUSE by SAP BE of Walldorf, Germany; products by TERADATA CORP. of Dayton, Ohio; APACHE HIVE; or other products. Data sources 112 can also include business intelligence platforms and products (e.g., as provided by DOMO, INC. of American Fork, Utah), spreadsheets (e.g., comma separated variable files, EXCEL files, etc.), databases (e.g., SQL databases; DB2 by INTERNATIONAL BUSINESS MACHINES CORPORATION of Armonk, N.Y.; databases by ORACLE CORPORATION of Redwood Shores, Calif.; and POSTGRESQL databases by POSTGRESQL GLOBAL DEVELOPMENT GROUP), SSH connections, distributed file systems (e.g., HADOOP DISTRIBUTED FILE SYSTEMs by the APACHE SOFTWARE FOUNDATION of Forest Hill, Md.), and collaborative platforms (e.g., SHAREPOINT BY MICROSOFT CORPORATION of Redmond, Wash.), among others.

The data sources 112 can have dependencies on one another. An example of such a dependency is shown in FIG. 2.

Figure 2:
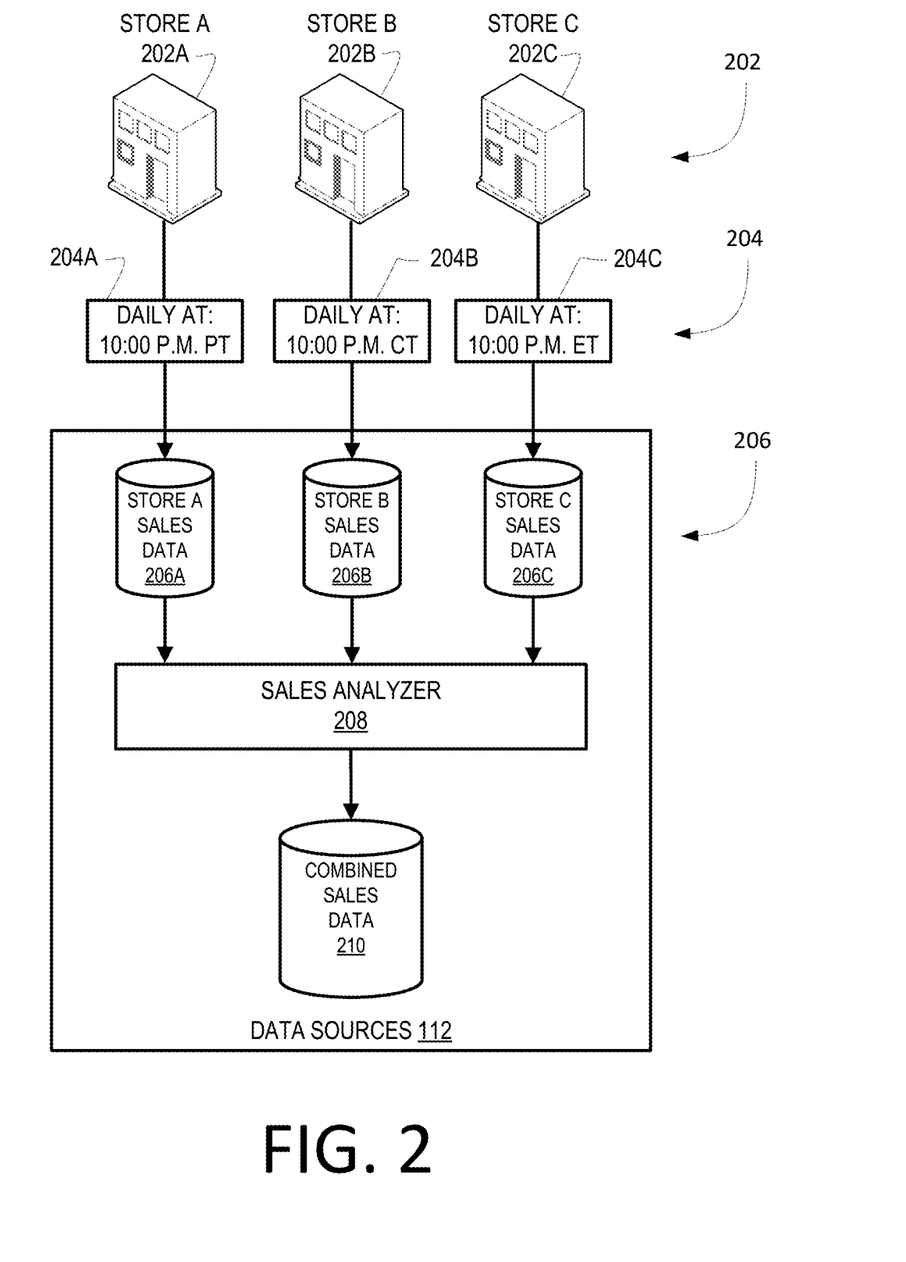
FIG. 2 illustrates example data having dependencies.

FIG. 2 illustrates example data in the data sources 112 that have dependencies. The data sources 112 may obtain or be provided information from store A 202A, store B 202B, and store C 202C (collectively stores 202). At the closing time 204 of the stores 202, the stores 202 may provide daily sales data 206. For example, store A 202A may be in the Pacific Time Zone and have a closing time 204A of 10:00 p.m. Pacific Time (PT). Store B 202B may be in the Central Time Zone and have a closing time 204B of 10:00 p.m. Central Time (CT). Store C 202C may be in the Eastern Time Zone and have a closing time 204C of 10:00 p.m. Eastern Time (ET).

The sales data 206 for each store may be obtained by the data sources 112 either by the pulling the data from the stores 202 or received by the data being pushed from the stores 202. A sales analyzer 208 component of the data sources 112 may process the sales data 206 and output combined sales data 210 based thereon. The combined sales data 210 may, for example, include the average sales for the stores 202 or other statistical data. The combined sales data 210 is dependent on the individual sales data 206 of the stores 202. For instance, the average daily sales for the three stores 202 cannot be determined until the data 206 for the individual stores 202 is obtained.

Figure 3:
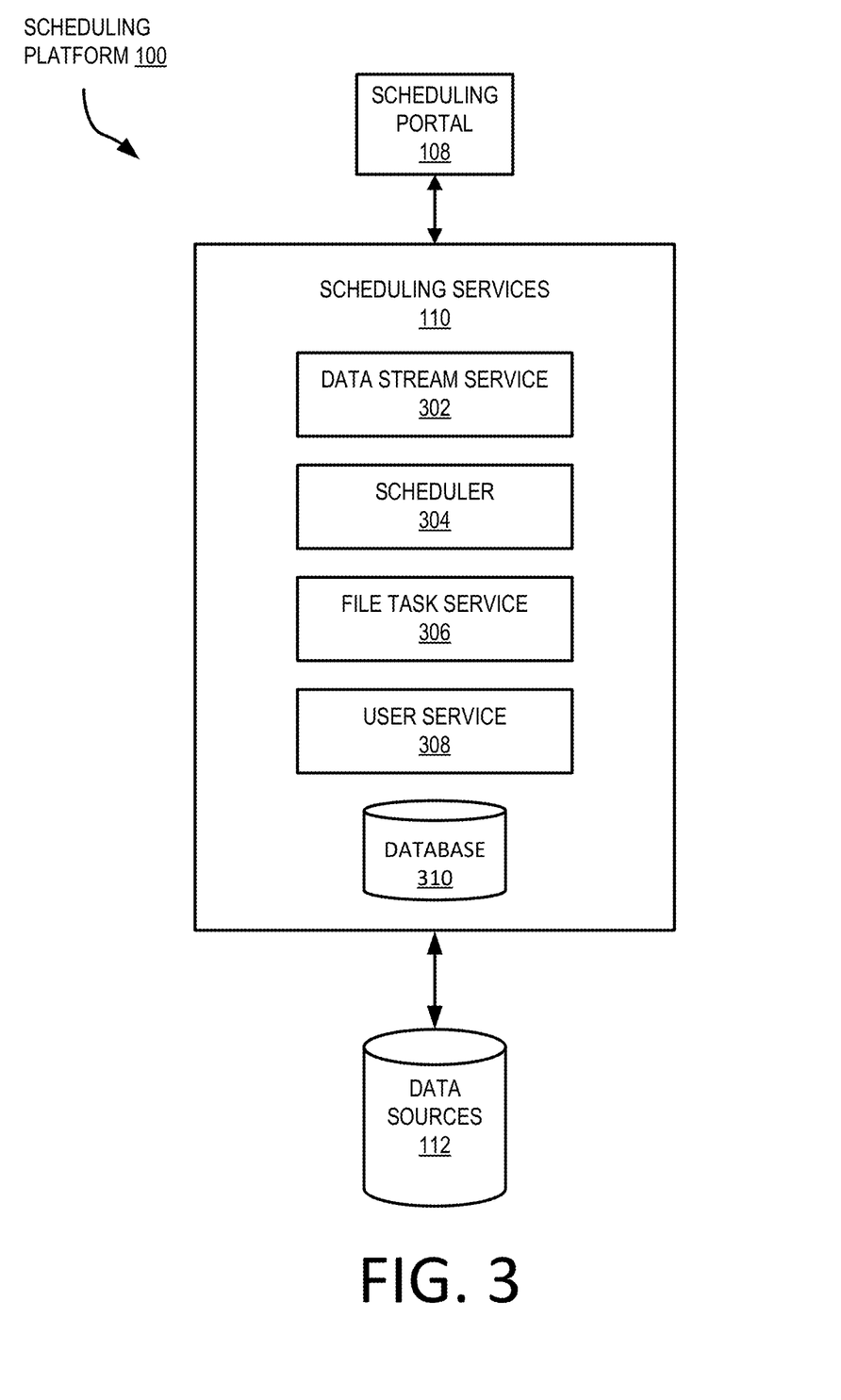
FIG. 3 illustrates a portion of the scheduling platform of FIG. 1 with additional detail in an example implementation of the scheduling services.

FIG. 3 illustrates a portion of the scheduling platform 100 of FIG. 1 with additional detail in an example implementation of the scheduling services 110. In the example implementation, the scheduling services includes a data stream service 302, a scheduler 304, a file task service 306, and a user service 308.

The data stream service 302 can be a data manipulation service. The data stream service 302 can be configured to facilitate connections with the data sources 112 and functionality, including extract-load-transform functionality. This can include the extraction of data from the data sources 112, loading the data into another portion of the data sources 112, and transforming data within the data sources 112. In an example, the data stream service 302 can connect to a data source, select some data via an SQL statement, and stream the results as records to a destination (e.g., a file or table). Adapters can be used to enable functionality for each data source and destination type of the data sources 112.

In an example, the data stream service 302 can perform an SQL operation on data. For example, there can be an input record stream and an adaptor can be used to perform the SQL operation on one or more of the data sources 112. Then an output record stream can be used to write the output of the operation to one or more of the data sources 112. In an example, the data stream service 302 can perform operations on a partition level, which can be multi-threaded such that functions can be applied to multiple partitions simultaneously in multiple threads. The data stream service 302 can be created in multiple different ways. In an example, the data stream service 302 includes a JAVA component and includes multiple web classes. In still further examples, the data stream service can perform an operation in a different Data Structure Language (DSL) on data.

The information within the data sources 112 can encompass data of various levels of formatting and organization. Continuing the example of FIG. 2, the data sources 112 can include raw data from individual stores (e.g., store sales data 206). The raw data might not be in a standardized format. The data stream service 302 may extract information from the raw data, load it into a data repository (e.g., a data warehouse), and facilitate transforming the data from a raw format to a standardized format. The data stream service 302 can also facilitate moving or summarizing data.

In some examples, the data stream service facilitates obtaining ingestion of data from data creators, such as stores 202. The data can be ingested in a variety of ways. In an example, the data is ingested using a Representational State Transfer (REST) API allowing for data source platforms (e.g., third-party data providers) to send structured JAVASCRIpT Object Notation (JSON) data to an endpoint of the portal services 110. In this manner, the data source platforms can push data to the data sources 112 via the data stream service 302. In some examples, the data stream service 302 can fetch data from data creators via poll requests or using data crawlers.

The scheduler 304 is a service for scheduling one or more jobs. Additional details regarding example implementations of the scheduler 304 are described throughout this disclosure, including in relation to FIGS. 4 and 5. The file task service 306 is a service for working with files, including accessing, loading, extracting data from, moving, monitoring, compressing, deleting, and archiving files. The file task service 306 can cooperate with other components of the platform 100 to provide file task services.

The user service 308 is a service configured to provide a variety of user-related services, including services related to providing information to and receiving information from the user, as well as processing information. For example, the user service 308 can receive information (e.g., queries) provided by the user over the scheduling portal 108 and provide the information to relevant components within the scheduling services 110 or can respond to the information directly. In another example, the user service 308 interfaces with the scheduling portal and facilitates providing information to the user over the scheduling portal 108.

The database 310 can store scheduling services data for reporting, backup, or other purposes. In some examples, the database 310 cooperates with the other components of the scheduling services 110. The database 212 can be implemented in a variety of ways, including but not limited to a document-oriented database (e.g., MONGODB by MONGODB, INC.).

Figure 4:
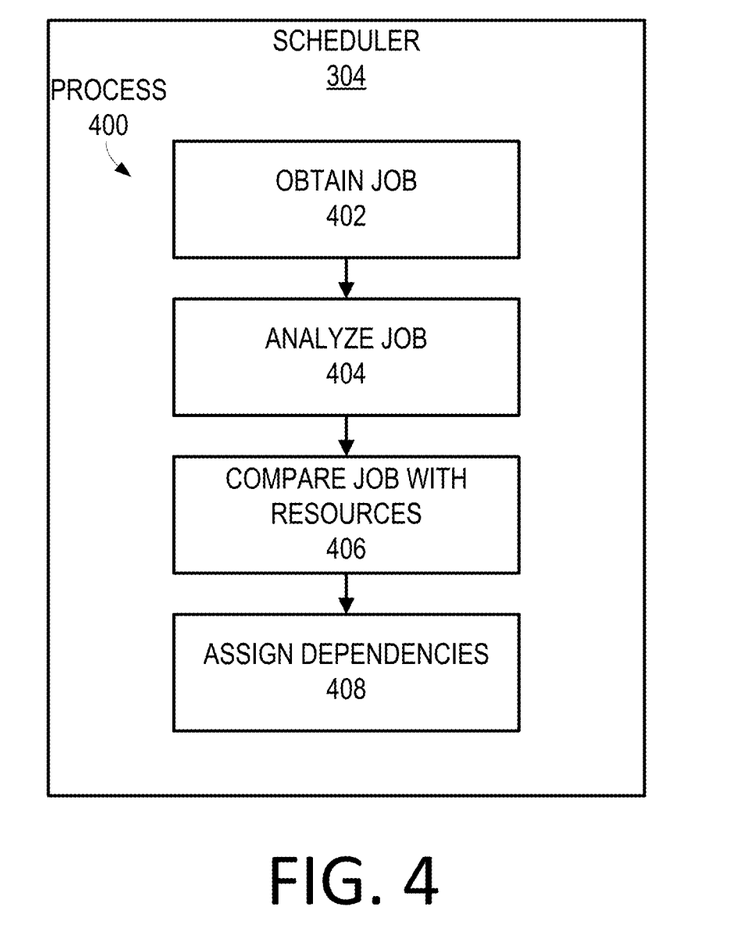
FIG. 4 illustrates an example process implemented by the scheduler for automatically inferring dependencies.

FIG. 4 illustrates an example process 400 implemented by the scheduler 304 for automatically inferring dependencies. Generally the process 400 involves analyzing a received job, extracting resource references identified in the job, and cross referencing the identified resources with other resources (if any). Where dependencies are identified, a dependency relationship (e.g., a directed graph expressing the dependency relationship) can automatically be created based on the results. This dependency relationship can be used to manage execution of a job, and ensuring that tasks within a job are performed in order and with all dependencies on other tasks or data in place before the task is executed.

The process can begin with operation 402, which involves obtaining a job. A job defines one or more tasks that are requested to be performed. Tasks can include one or more parameters, including one or more data sources (e.g., a data source of data sources 112 or another task) on which the task depends. In some examples, the task can be defined in relation to one or more resource statuses (e.g., statuses of data sources). The job can be obtained in a variety of different ways, including from a user over the scheduling portal 108. In some examples, the job is created using a form defined by the scheduling portal 108. In some examples, the job includes a query (e.g., an SQL query).

As an example, and with reference to FIG. 2, the job may be to send an up-to-date, or periodic, report of average daily sales for store A 202A, store B 202B, and store C 202C to a particular person. Parameters of the task may be identifiers of the stores 202, identifiers of the data sources 206 that contain the relevant data, identifiers of particular areas (e.g., fields) of the data sources 206 that contain the relevant data, instructions regarding how to process the obtained data (e.g., average the obtained data), and an email address to which to send the report, among other parameters. After obtaining the job in operation 402, the flow of the process 400 can move to operation 404.

Operation 404 involves analyzing the job. The job can be analyzed to determine whether the job includes dependencies. Dependencies are any resources on which the job relies that may change over time (e.g., thereby causing the resource to not be up-to-date or otherwise ready or available for use by the job) or may be unavailable when needed. For example, a database of sales figures may be a resource that qualifies as a dependency because the sales figures may change over time as new sales are made. In addition, even historic sales figures that may not change can be considered a dependency in some implementations because there may be a risk that the data may not be available when needed on (e.g., a server on which the historic sales data is stored may be offline for maintenance).

Determining whether dependencies exist can involve parsing the job to identify mutable resources relied upon on in the job. In some examples, this can involve natural language processing to analyze the job. In some examples, the user (or another person) can explicitly identify external resources. For instance, where the job involves execution of an SQL query, tables, and databases referenced in the query can be identified as dependencies. In another example (e.g., SQL-driven extract, load, transform tasks) dependencies can be extracted from SQL statements using the EXPLAIN SQL statement or using lexographic analysis.

Continuing the example made with reference to FIG. 2, the dependencies may be the data sources 206 that contain relevant data (e.g., names and/or locations of relevant databases), and the particular areas within the data sources 206 (e.g., tables and/or fields of the relevant databases). The data sources 206 are dependencies because they may or may not be up-to-date when the job is to be performed. After analyzing the job, the flow of process 400 can move to operation 406.

Operation 406 involves comparing the job with resources. This can include determining whether the dependencies identified in operation 404 include resources having dependencies. This can include determining whether the identified dependencies match dependencies previously known or otherwise identified by the scheduling platform. This can also include analyzing the resource (e.g., as in operation 404) and determining whether that resource itself includes dependencies.

Continuing the example made with reference to FIG. 2, it was determined in operation 404 that the data sources 206 are resources on which the combined sales data depends 210. The data sources 206 can then be analyzed for their own dependencies. Indeed, as shown in FIG. 2, the data sources 206 depend on the closing time 204 of the respective stores 202. The closing time 204 can be identified as an aspect in operation 406. In some examples, they may be identified as an aspect because a prior iteration of the process 400 identified the data sources 206 as dependencies of the store sales data 206. For instance, all directed graphs having the identified resource as a node can be analyzed to determine if the identified resource has a dependency. In other examples, a user of the platform 100 may flag the sales data 206 as having that dependency (e.g., during creation of the sales data 206). In still other examples, the data 206 may be analyzed to by the platform 100 and identified as depending on the daily closing time 204 of the stores 202.

Operation 406 can be repeated for each new dependency found. When no new dependencies are identified, the flow of process 400 can move to operation 408.

Operation 408 involves assigning dependencies. This can include creating a dependency relationship between the dependencies identified in operation 406 and operation 408. This can also include creating or updating a directed graph of dependencies. This can involve storing the directed graph or updating entries in a database (e.g., database 310) based thereon.

Figure 5:
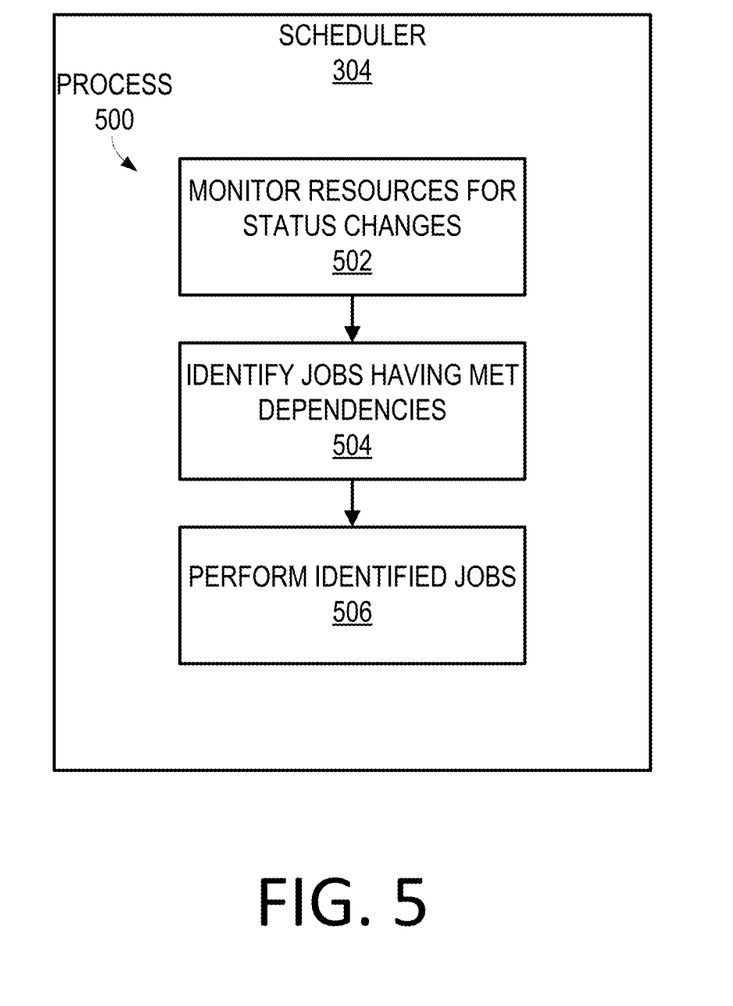
FIG. 5 illustrates an example process for task scheduling using the identified dependencies.

FIG. 5 illustrates an example process 500 for task scheduling using the identified dependencies. The process can begin with operation 502, which involves monitoring resources for status changes. For example, the scheduler 304 can have a data structure containing all of the known dependencies for scheduled jobs (e.g., a list or table that associates dependencies with jobs). The scheduler 304 (or another component, such as the file task service 306) can traverse the list and check to determine if the status of a resource has changed. The scheduler 304 directly monitors the resources for changes or another process can extract status changes from the resources and provide information regarding the changes to the scheduler (e.g., by changing a flag in a database).

In an example, the change can be from an un-updated state to an updated state. This can be determined in a variety of ways. In one example, the scheduler 304 monitors metadata associated with the resource and identifies changes in metadata indicative of a change in status. For instance, the metadata may include a last updated time, number of rows, number of columns, number of data entries, and a last access time, among others. When one of those metadata items is updated or changed (e.g., the last updated time being changed to a more-current time), then it may be indicative of a change in status. In another example, the scheduler 304 can receive a notification from a user or other source that a resource is updated. For instance, a user may force the scheduler 304 to treat a resource as updated whether it is or is not updated. In another instance, a process can inform the scheduler 304 that a particular resource has a change in status. In another example, the scheduler may determine whether conditions of a resource are met. For instance, there may be an alarm resource and the status can be considered changed when a time specified in the alarm resource occurs.

In some examples, the scheduler 304 need not monitor resources that themselves have dependencies until those dependencies are of the appropriate status. This can help improve efficiency of the program and cause it to consume fewer computing resources because fewer items need to be monitored.

Continuing the example with reference to FIG. 2, the scheduler 304 may monitor the store sales data 206 and the closing time 204 of the stores. Because the store sales data 206 depends on the closing time 204 of the stores, the scheduler 304 may first monitor the closing time 204 resources until their status met. For example, the scheduler may first analyze the closing time 204A of store A 202A (daily at 10:00 p.m. PT). When time is reached that day, the scheduler 304 can consider that dependency met. The scheduler 304 can then analyze status of the store sales data 206A to determine whether it has been updated. This process continues for closing times 204B, 204C and store sales data 206B, and 206C.

In some examples, the scheduler 304 may automatically know the state of the resources that it processes based on a publish-subscribe model. For example, in a publish-subscribe model, jobs may run when the data that they subscribe to is available for a next processing period. Upon a successful completion, a job publishes its data output for that time period, which allows any jobs to trigger that are waiting on that data.

To integrate with external systems that use other scheduling techniques, the scheduler 304 (or a component cooperating with the scheduler) may use a polling method that scans processing metadata in order to establish a "last processed" date/time for the externally-processed tables or files. This allows the user to schedule jobs to run when data is available in systems external to scheduler 304.

In some examples, the flow of process 500 can move to operation 504 after the each change in status is detected. This can be advantageous if there are high-priority or otherwise time-sensitive tasks that depend on the changed resources. In other examples, the process 500 can continue to traverse the data structure of resources and wait until it has traversed the entire data structure and, having identified a change in status for at least one resource, move to operation 504. Depending on the structure of dependencies (e.g., many jobs with multiple dependencies), this may be overall more efficient.

Operation 504 involves identifying jobs that have dependencies met. This can involve traversing a data structure storing jobs and determining whether all dependencies of those jobs are met (e.g., have a status that is acceptable). If the dependencies of one or more jobs are met, then process 500 can move to operation 506.

Continuing the example with reference to FIG. 2, once the store sales data 206 resources have acceptable statuses (e.g., having a status of "updated"), then the scheduler 304 can identify the sales analysis job (e.g., determining average sales for the day) as having its dependencies met.

Operation 506 involves causing the identified jobs to be performed. This can involve the scheduler sending a signal that causes another process or component the platform 100 to perform the job. In some examples, this can involve adding the particular job to a work queue or flagging a particular job as being ready to be performed.

Continuing the example with reference to FIG. 2, once the scheduler 304 identifies the sales analysis job as having its dependencies met, the scheduler 304 can perform the sales analysis job or cause the sales analysis job to be performed.

Figure 6:
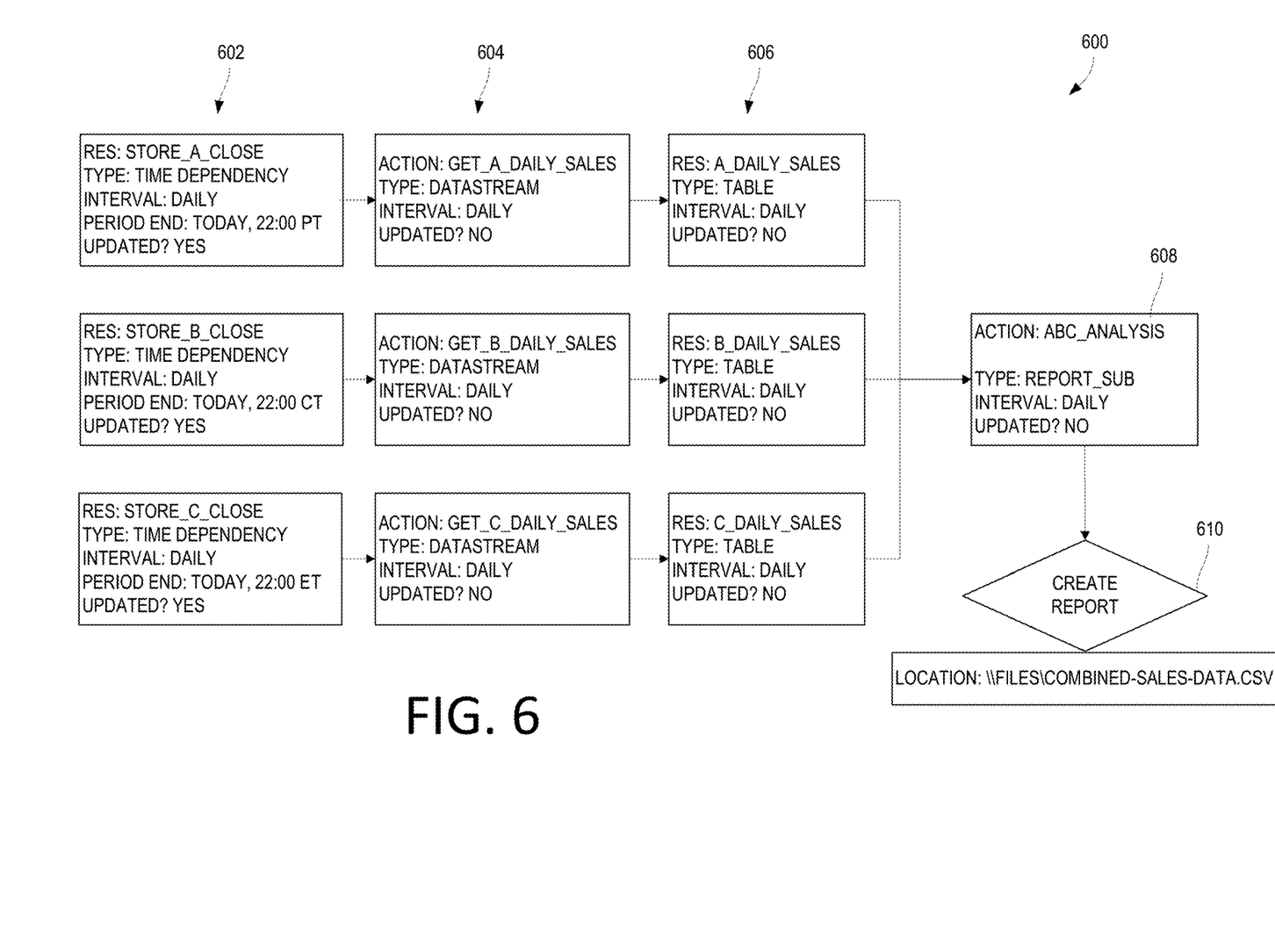
FIG. 6 illustrates an example dependency graph based on the example of FIG. 2.

FIG. 6 illustrates an example dependency graph 600 based on the example of FIG. 2. The dependency graph 600 includes closing time nodes 602, which relate to the closing time 204 of respective stores 202. The closing time nodes 602 of a "time dependency" type with a daily interval and having a period ending at a particular time, which indicates that they represent a time dependency resource that recurs daily at the particular time (e.g., 22:00 PT or 10:00 p.m. PT). As illustrated, the closing time nodes 602 are all updated, which indicates that the dependencies are satisfied for all nodes 602 (e.g., the current time is past 22:00 ET, and all nodes have sequentially reprocessed upon completion of earlier dependent nodes). In example implementations, such interdependencies may be managed using locking of subsequent or dependent nodes on precursor nodes within the dependency graph 600.

The dependency graph 600 further includes get daily sales nodes 604, which depend from respective closing time nodes 602. These nodes 604 are of the type "Datastream", which indicates that they are relevant to acquiring, extracting, or otherwise manipulating data. These nodes 604 have a daily interval and have not yet been updated, indicating that the respective actions have not yet occurred.

The dependency graph 600 further includes daily sales table nodes 606, which depend from the get daily sales nodes 604. The daily sales table nodes 606 represent tables that are updated with the information obtained by the actions associated with nodes 604.

The dependency graph 600 further includes an analysis action node 608 that depends from each of the daily sales table nodes 606. The analysis action node 608 is of a "report subscription" type, indicating that it is relevant to generating reports to send to subscribers.

The dependency graph 600 further includes a create report node 610 that creates report at a particular location based on the results associated with node 608.

FIGS. 7-11 illustrate example user interfaces allowing users to create or customize tasks, resources, or components thereof. For instance, the platform 100 may be configured to provide the user interfaces over the scheduling portal 108.

The example userS interfaces are provided with reference to the example of FIG. 6, which is based on FIG. 2.

Figure 7:
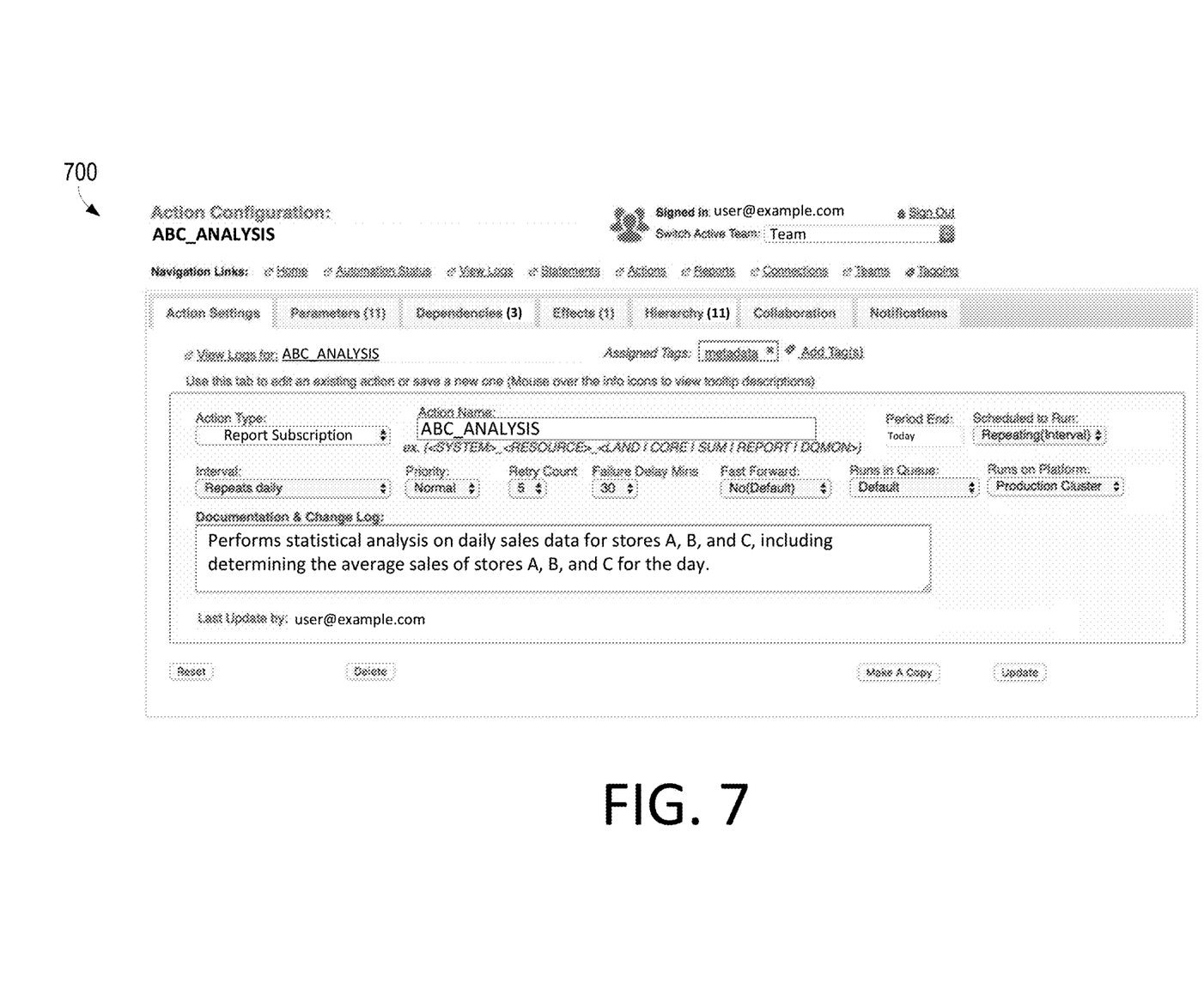
FIG. 7 illustrates an example user interface for customizing an action of a job.

FIG. 7 illustrates an example user interface 700 for customizing an action of a job. As illustrated, the user interface 700 is for customizing the ABC_ANALYSIS action of FIG. 6. That action involves performing statistical analysis on daily sales data for stores A, B, and C 202, including determining the average sales of the stores 202 for the day. The user interface 700 allows the user to customize various aspects of the action, including its type, name, period, schedule (e.g., repeating or one-time), interval (e.g., monthly, fiscal monthly, weekly, daily, hourly, etc.), priority (e.g., high, low, or normal), retry count (e.g., how many times to retry the action if it fails), failure delay (e.g., how many minutes to wait before retrying a failed action), fast forward, whether the action runs in a queue, and which platform the action should be run on (e.g., a production cluster, a testing cluster, etc.), though others are also possible. The user interface 700 also allows users to add tags or other metadata to the action to assist in organization. The user interface 700 also allows users to view logs for the action (e.g., logs of previous instances where the action was performed). The user interface 700 also allows users to navigate to other user interfaces (see, e.g., FIGS. 8-10) by selecting tags.

Figure 8:
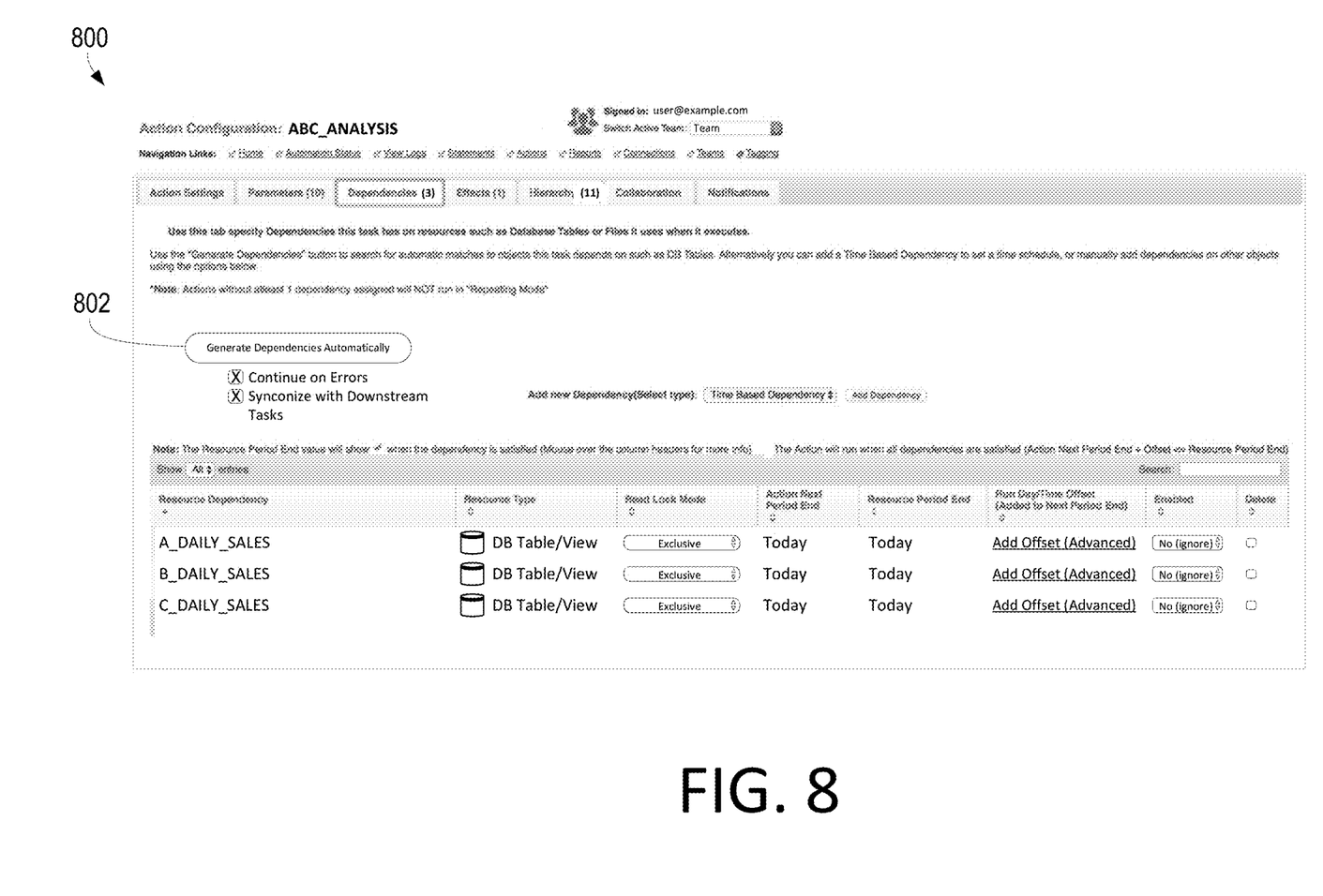
FIG. 8 illustrates an example dependency tab user interface.

FIG. 8 illustrates an example dependency tab user interface 800. This user interface allows user to view, create, or modify dependencies associated with the selected action. Here, because the action is the ABC_ANALYSIS action, it shows the daily sales table nodes 606 dependencies. It provides useful information regarding the dependencies, including a type of resources (e.g., database tables, reports, time dependencies, etc.), whether there is a lock on the resource, when the next action period or resource period will end, whether there is an offset to the run time, and a check box for selecting and deleting the dependency. In example implementations, establishing/defining such dependencies results in an automatically applied dependency among nodes based on the sequential relationship that is defined among the nodes. The system will, based on the inputs and outputs of each node, determine whether any particular node can run analysis at a given time—e.g., whether there is a direct relationship to other nodes that it depends on, whether objects are available from those other nodes for purposes of execution of the node, etc.

The user interface 800 further includes a user interface element 802 (e.g., a button) for generating dependencies automatically. This can allow the user to generate dependencies based on information already provided by the user, such as by using the process 400. For example, the user can provide an SQL query to be run as part of the action, and the user can simply access the user interface element 802 (e.g., click the button) and the platform 100 will scan the SQL query, determine the dependencies (e.g., including the period end of the source data), and use the determined information to populate the user interface 800 and the back end system with the appropriate dependencies. This can provide an easy way for the user to set correct dependencies.

Figure 9:
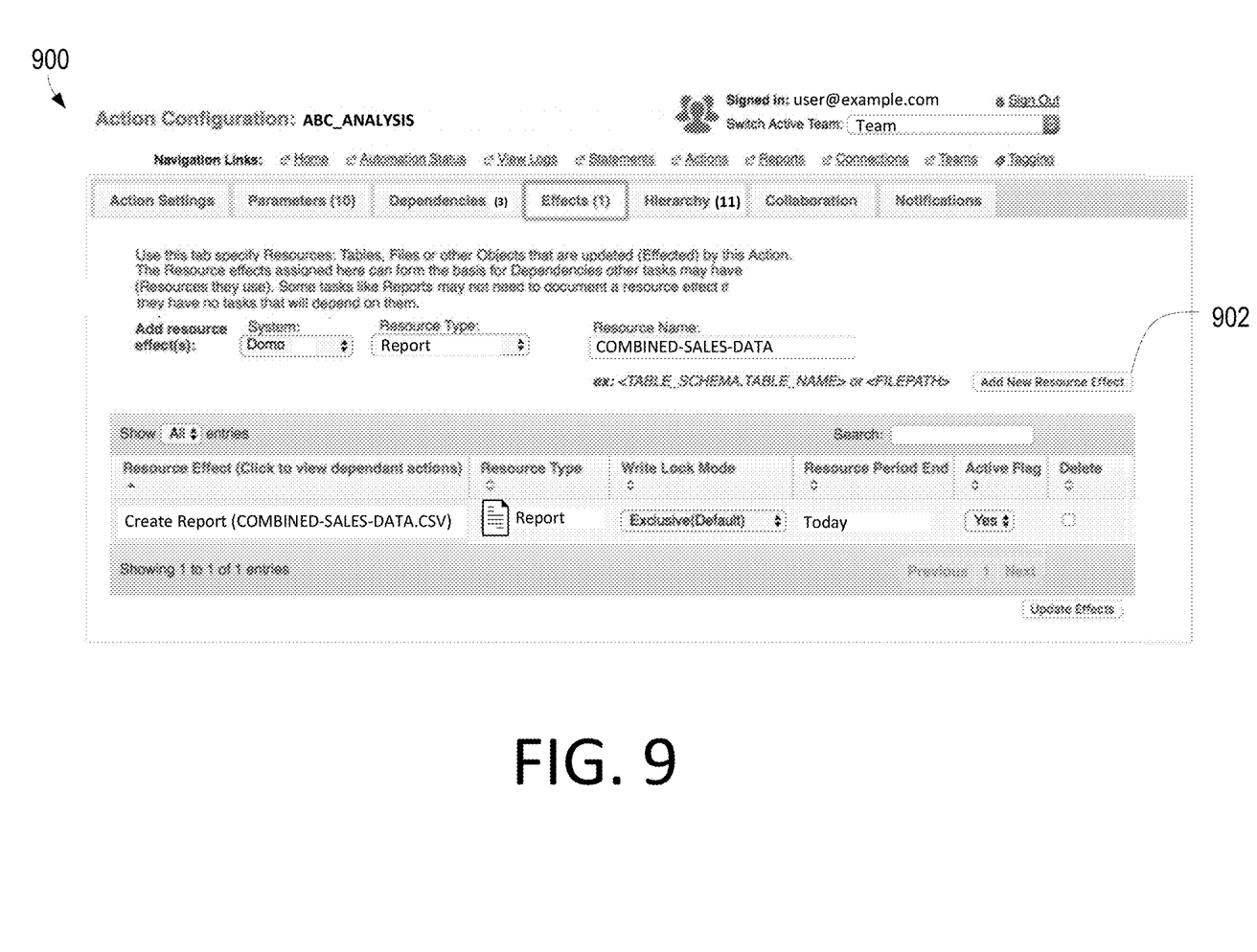
FIG. 9 illustrates an example user interface allowing the user to describe effects of the action.

FIG. 9 illustrates an example user interface 900 allowing the user to describe effects of the action. For example, the user may select an add-new-resource-effect button 902 and the platform 100 can automatically add the one or more resources that the action is effecting (e.g., in this case creating a report at a location). This can be helpful if the user wants to create a second action that is executed when the current action is completed (e.g., taking an action with respect to the report). The effect can be used as a dependency in downstream jobs.

Figure 10:
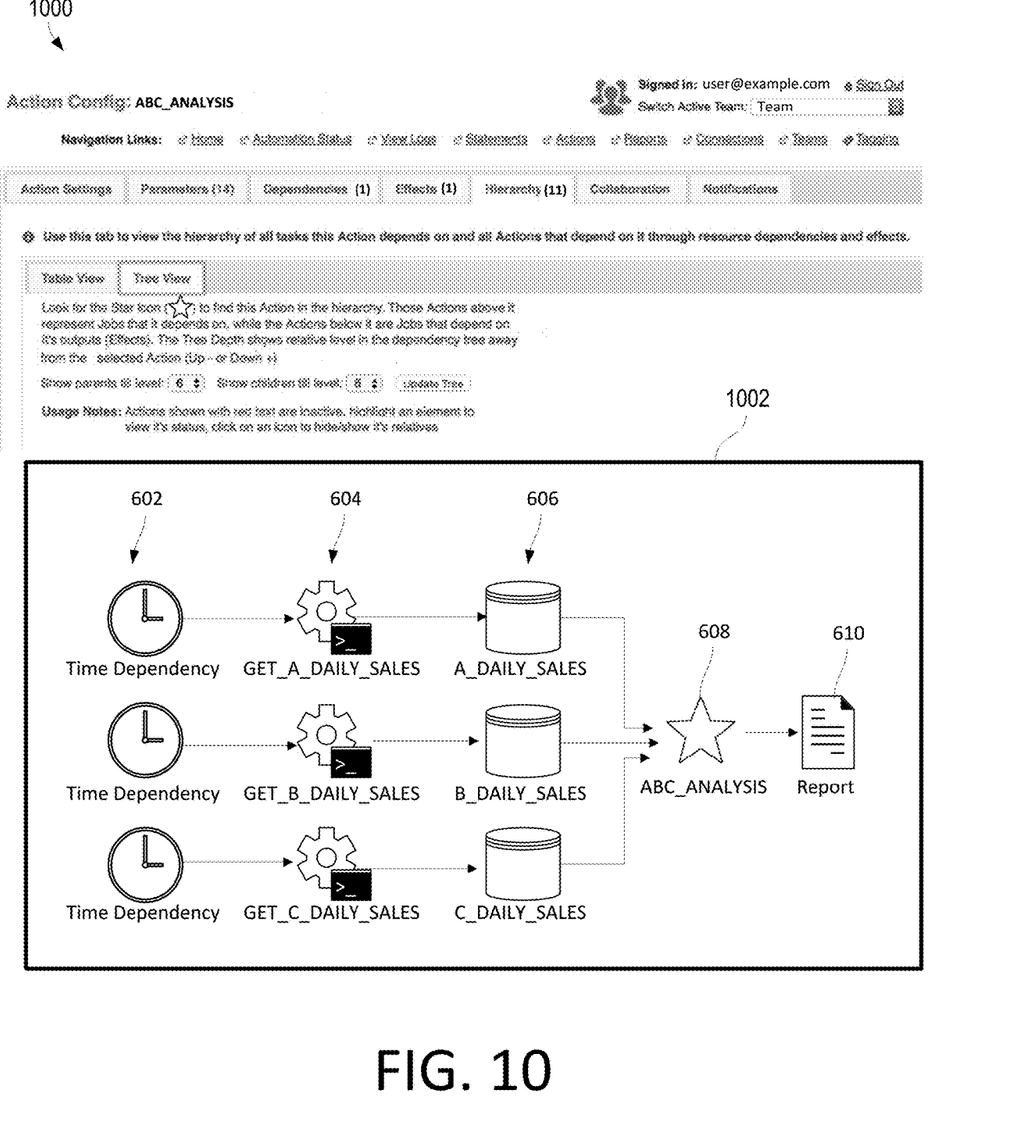
FIG. 10 illustrates an example user interface for viewing and modifying a hierarchy.

FIG. 10 illustrates an example user interface 1000 for viewing and modifying a hierarchy. For example, the screen provides a simplified view 1002 of the dependency graph 600 of FIG. 6. The simplified view 1002 can be generated automatically based on the user-provided or automatically-generated information regarding the effects and the dependencies. In this manner, the user does not need to worry about where the action fits into complicated workflows, the platform 100 figures the placement based on metadata, period end, and the resources the action depends on and/or effects, among other aspects. In the simplified view 1002, the action being currently viewed (e.g., in the illustrated case, the ABC_ANALYSIS action 608) is replaced with a special icon to make it more visible to the user. This user interface 1000 can aid in the user's understanding of the dependencies and how the current action fits in relation thereto.

Figure 11:
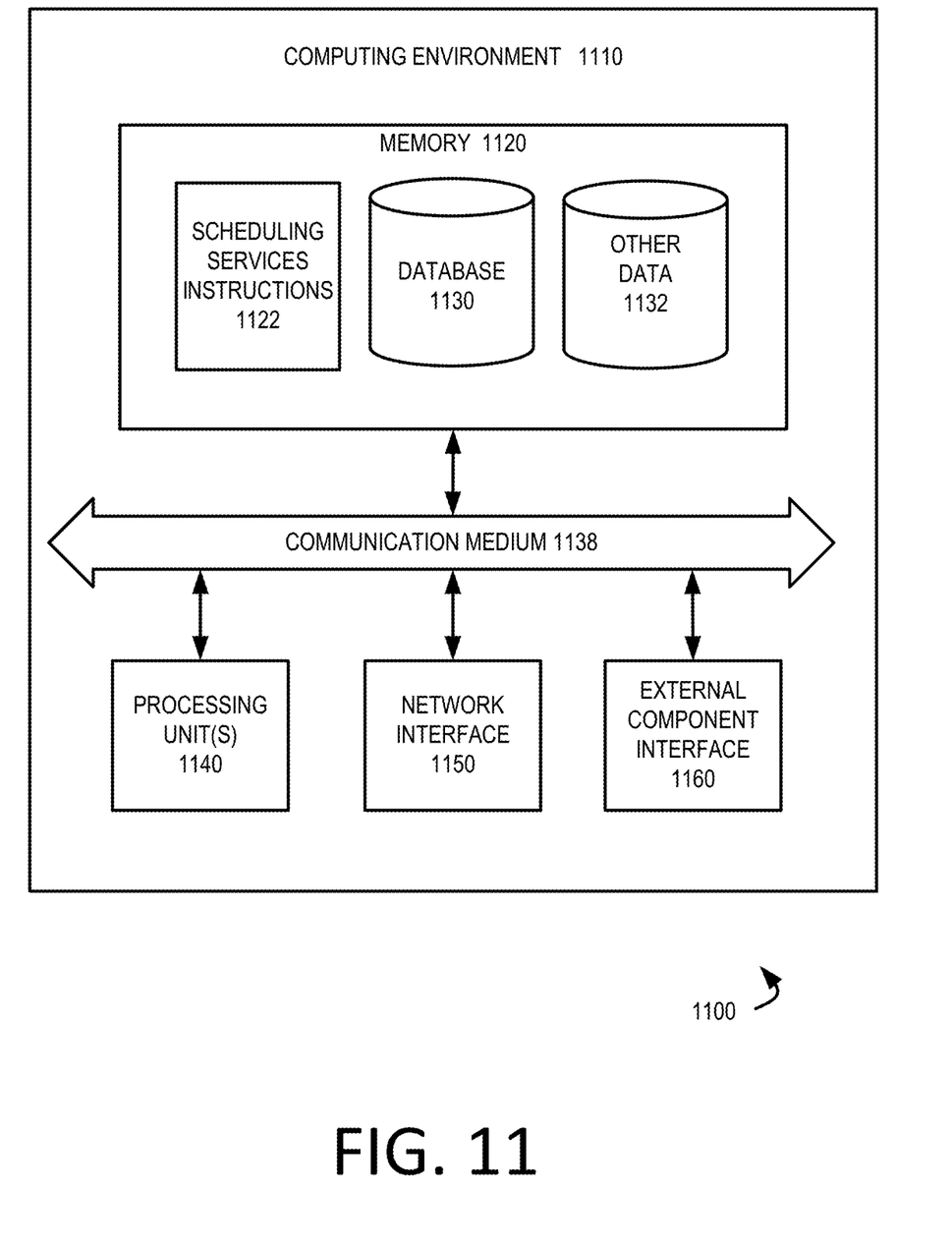
FIG. 11 illustrates an example system with which disclosed systems and methods can be used.

FIG. 11 illustrates an example system 1100 with which disclosed systems and methods can be used. In an example, the user device 102, computing environment 106, and data source 112 can be implemented as one or more systems 1100 or one or more systems having one or more components of systems 1100. In an example, the system 1100 can include a computing environment 1110. The computing environment 1110 can be a physical computing environment, a virtualized computing environment, or a combination thereof. The computing environment 1110 can include memory 1120, a communication medium 1138, one or more processing units 1140, a network interface 1150, and an external component interface 1160.

The memory 1120 can include a computer readable storage medium. The computer storage medium can be a device or article of manufacture that stores data and/or computer-executable instructions. The memory 1120 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1120 can store various types of data and software. For example, as illustrated, the memory 1120 includes scheduling services instructions 1122 for implementing one or more aspects of the scheduling services described herein, database 1130, as well as other data 1132. In some examples (e.g., where the computing environment 1110 is a user device 102), the memory 1120 can include instructions for accessing a scheduling portal. In some examples (e.g., where the computing environment 1110 is a data source 112), the memory 1120 can include instructions for acting as a data source.

The communication medium 1138 can facilitate communication among the components of the computing environment 1110. In an example, the communication medium 1138 can facilitate communication among the memory 1120, the one or more processing units 1140, the network interface 1150, and the external component interface 1160. The communications medium 1138 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1140 can include physical or virtual units that selectively execute software instructions. In an example, the one or more processing units 1140 can be physical products comprising one or more integrated circuits. The one or more processing units 1140 can be implemented as one or more processing cores. In another example, one or more processing units 1140 are implemented as one or more separate microprocessors. In yet another example embodiment, the one or more processing units 1140 can include an application-specific integrated circuit (ASIC) that provides specific functionality. In yet another example, the one or more processing units 1140 provide specific functionality by using an ASIC and by executing computer-executable instructions.

The network interface 1150 enables the computing environment 1110 to send and receive data from a communication network (e.g., network 140). The network interface 1150 can be implemented as an Ethernet interface, a token-ring network interface, a fiber optic network interface, a wireless network interface (e.g., WI-FI), or another type of network interface.

The external component interface 1160 enables the computing environment 1110 to communicate with external devices. For example, the external component interface 1160 can be a USB interface, Thunderbolt interface, a Lightning interface, a serial port interface, a parallel port interface, a PS/2 interface, and/or another type of interface that enables the computing environment 1110 to communicate with external devices. In various embodiments, the external component interface 1160 enables the computing environment 1110 to communicate with various external components, such as external storage devices, input devices, speakers, modems, media player docks, other computing devices, scanners, digital cameras, and fingerprint readers.

Although illustrated as being components of a single computing environment 1110, the components of the computing environment 1110 can be spread across multiple computing environments 1110. For example, one or more of instructions or data stored on the memory 1120 may be stored partially or entirely in a separate computing environment 1110 that is accessed over a network.

Depending on the size and scale of the computing environment 1110, it may be advantageous to include one or more load balancers to balance traffic across multiple physical or virtual machine nodes. In an example, the node balancer may be a node balancer product provided by F5 NETWORKS, INC. of Seattle, Wash.

Aspects of the platform 100 and the computing environment 1110 can be protected using a robust security model. In an example, users may be made to sign into the system using a directory service, such as ACTIVE DIRECTORY by MICROSOFT CORPORATION of Redmond, Wash. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full platform 100, such that portal can run and schedule jobs and serve the portal user interface as long as a single node remains functional. The environment 1110 may include monitoring technology to determine when a node is not functioning so an appropriate action can be taken.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A computer-implemented method comprising:
    obtaining a job, wherein the job defines one or more tasks that are to be performed;
    analyzing the job to identify one or more dependencies of the job, wherein the analyzing includes:
        identifying that the job relies on one or more mutable data structures; and
        identifying each of the one or more mutable data structures as a dependency of the job required as a data source to complete one or more of the tasks;
    generating a directed graph describing the job based on the analyzing of the job, wherein the directed graph includes the identified one or more dependencies of the job as nodes of the directed graph;
    determining, using the directed graph, whether to take an action with respect to the job; and
    taking the action responsive to determining to take the action with respect to the job.

2. The method of claim 1,
    wherein the determining whether to take the action with respect to the job is based on the directed graph alone; and
    wherein identifying the one or more dependencies of the job is based solely on the job without additional user input.

3. The method of claim 1, wherein the one or more dependencies comprise a time dependency defining a time interval and a time period end.

4. The method of claim 1, wherein the one or more dependencies comprise a data stream dependency associated with a data source.

5. The method of claim 1, wherein the job comprises a statement in a data structure language (DSL); and wherein analyzing the job to identify the one or more dependencies comprises extracting the one or more dependencies from the DSL statement.

6. The method of claim 1, wherein the obtained job includes a pre-condition defining at least one of the one or more dependencies.

7. The method of claim 1, wherein the obtained job includes a post-condition defining at least one effect of the job being completed.

8. The method of claim 1, wherein the directed graph is an acyclic directed graph.

9. The method of claim 1,
    wherein at least one of the mutable data structures is a database; and
    wherein the method further comprises:
        monitoring the database for changes in metadata of the database.

10. The method of claim 1, wherein at least one of the nodes of the directed graph describes: a resource name, a resource type, and an interval.

11. A computer-implemented method comprising:
    obtaining a directed graph describing a job having one or more tasks that are to be performed and having one or more dependencies on one or more resources;
    monitoring the resources to determine whether the one or more dependencies are met, wherein the monitoring includes monitoring the one or more resources for changes in metadata of the one or more resources, wherein at least one of the one or more resources is a data structure required as a data source to complete one or more of the tasks, wherein monitoring the resources includes:
        monitoring the data structure for changes in metadata of the data structure to determine whether a dependency on the data structure is met; and
    responsive to determining that all dependencies of the job are met, taking an action associated with the job.

12. The method of claim 11, wherein monitoring the resources comprises monitoring for a published data output from a source associated with at least one of the one or more dependencies.

13. The method of claim 11, wherein monitoring the one or more resources for changes in the metadata includes monitoring for changes in a last update time, a number of rows, a number of columns, a number of data entries, or a last access time of a respective resource.

14. A system comprising:
    one or more processors; and
    memory comprising instructions that, when executed by the one or more processors, cause the one or more processors to:
        provide a job creation user interface that allows a user to create a job having one or more tasks that are to be performed;
        provide a dependency user interface that allows the user to specify dependencies associated with the job;
        provide an effect user interface that allows the user to specify an effect of the job being completed;

analyze the job to identify one or more dependencies of the job, wherein the analyzing includes to identify whether the job relies on one or more mutable data structures and to identify each of the one or more mutable data structures as a dependency of the job required as a data source to complete one or more of the tasks; and generate a directed graph describing the job, wherein the directed graph includes the identified one or more dependencies of the job.

15. The system of claim 14, wherein the dependency user interface is configured to cause the one or more processors to analyze the job to identify the one or more dependencies of the job based solely on the job without additional user input.

16. The system of claim 15, wherein the job comprises a statement in a Data Structure Language (DSL); and wherein analyzing the job to identify the one or more dependencies comprises extracting the one or more dependencies from the DSL statement.

17. The system of claim 14, wherein analyzing the job to identify one or more dependencies of the job comprises identifying one or more user-specified dependencies.

18. The system of claim 14, wherein the instructions, when executed, further cause the one or more processors to determine whether to take an action with respect to the job based on the directed graph; and take the action responsive to the determination.

19. The system of claim 18, wherein determining whether to take the action with respect to the job based on the directed graph comprises monitoring dependencies based on the directed graph to determine whether the one or more dependencies are met; and wherein the instructions, when executed, further cause the one or more processors to, responsive to determining that all dependencies of the job are met, take the action associated with the job.

20. The system of claim 14, wherein monitoring the one or more dependencies comprises monitoring for a published data output from a source associated with at least one of the one or more dependencies.

* * * * *